March 8, 1955 S. C. CARNEY 2,703,494
DENSITY MEASURING APPARATUS
Filed March 3, 1952 4 Sheets-Sheet 1

INVENTOR.
S. C. CARNEY
BY Hudson & Young
ATTORNEYS

March 8, 1955 S. C. CARNEY 2,703,494
DENSITY MEASURING APPARATUS
Filed March 3, 1952 4 Sheets-Sheet 2
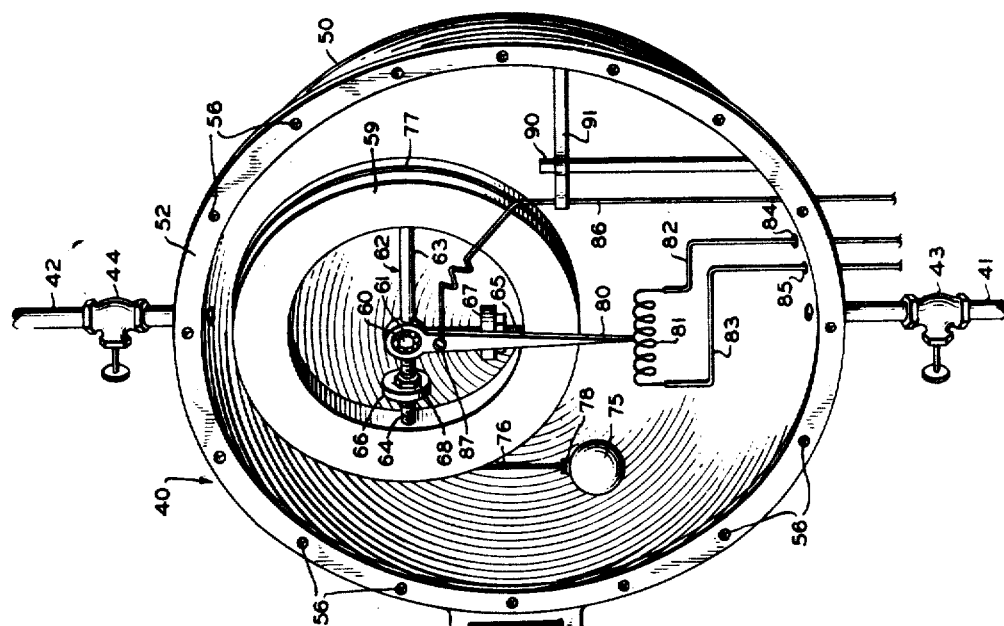
FIG. 2.
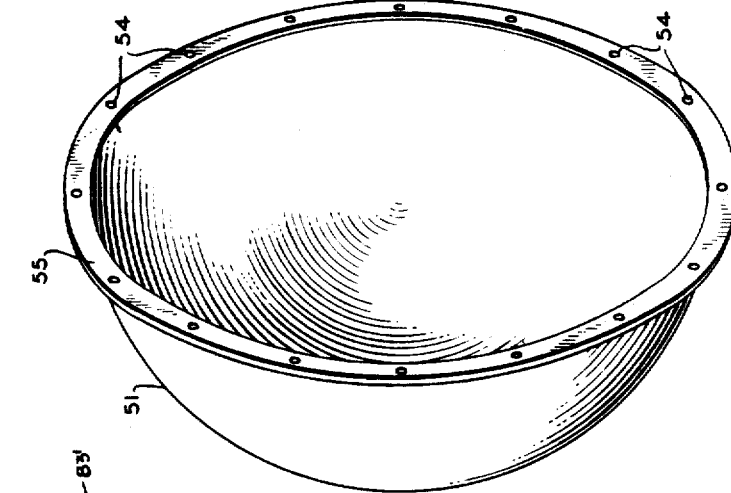
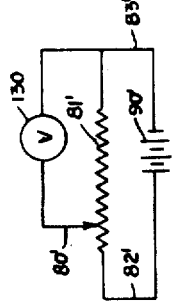
FIG. 9.
INVENTOR.
S. C. CARNEY
BY Hudson & Young
ATTORNEYS March 8, 1955         S. C. CARNEY         2,703,494
DENSITY MEASURING APPARATUS
Filed March 3, 1952         4 Sheets-Sheet 3
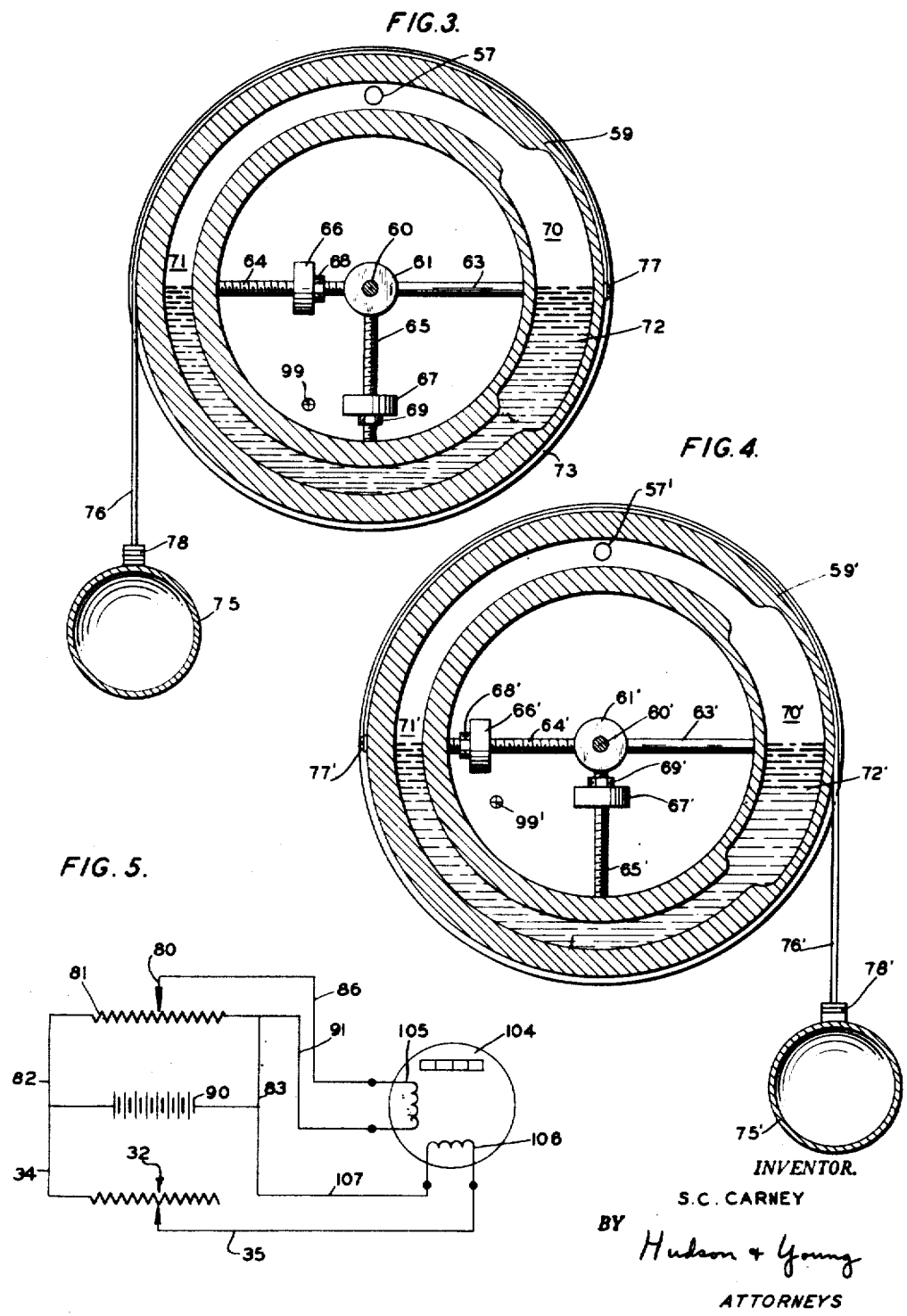
INVENTOR.
S. C. CARNEY
BY Hudson & Young
ATTORNEYS March 8, 1955  S. C. CARNEY  2,703,494
DENSITY MEASURING APPARATUS
Filed March 3, 1952  4 Sheets-Sheet 4
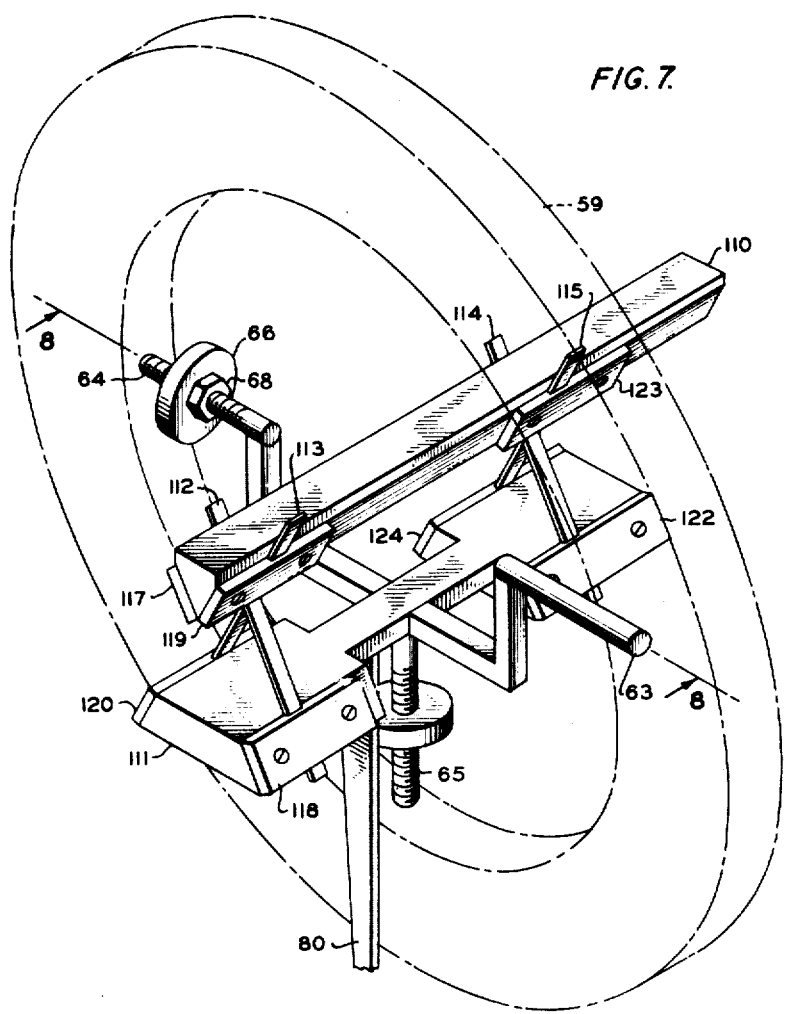
FIG. 7.
FIG. 8.
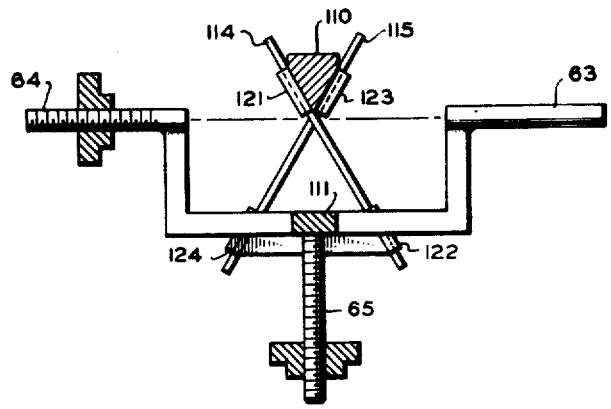
INVENTOR.
S. C. CARNEY
BY Hudson & Young
ATTORNEYS

United States Patent Office 2,703,494
Patented Mar. 8, 1955

2,703,494

DENSITY MEASURING APPARATUS

Samuel C. Carney, Bartlesville, Okla., assignor to Phillips Petroleum Company, a corporation of Delaware Application March 3, 1952, Serial No. 274,615

12 Claims. (Cl. 73—30)

This invention relates to the measurement of fluid flow through a pipe, conduit or the like. In another aspect it relates to means for continuously determining and recording the density of flowing fluids. In still another aspect it relates to the measurement of the weight of fluid flowing rather than the volume of flow.

In the gas industry practically all measurements of the rate of gas flow through a conduit are made by means of the orifice type flow meter. Such a meter consists essentially of a plate in the form of an apertured metal disk installed in the gas pipeline usually between a pair of bolted flanges. When fluid flows through the line, there is developed a pressure difference across the plate due to the increased velocity through the orifice, which is of smaller diameter than the remainder of the pipe. This pressure difference, referred to as the differential pressure, is within wide limits proportional to the square of the velocity of flow and is measured by means of a manometer connected to the gas pipeline on opposite sides fo the orifice.

The function of the orifice meter to measure fluid flow can be explained mathematically as follows. This explanation is begun with the well known and established relationship:

$$V^2 = 2gH \quad (1)$$

where V is the velocity of fluid at flowing conditions, g is the acceleration due to gravity and H is the head of flowing fluid. Let it arbitrarily be defined that $V_1$ is the velocity of fluid in the pipe upstream from the orifice, $V_2$ is the velocity of fluid passing through the orifice, $d$ is the orifice diameter, D is the pipe diameter, $H_1$ is the head of fluid upstream from the orifice measured in terms of a liquid having the same density as the flowing fluid and $H_2$ is the head of fluid equivalent to the orifice pressure, also measured in terms of a liquid having the same density as the flowing fluid. From these definitions it follows that $$V_1^2 = 2gH_1 \quad (2)$$

and $$V_2^2 = 2gH_2 \quad (3)$$

from which $$V_2^2 - V_1^2 = 2g(H_2 - H_1) = 2gH_v \quad (4)$$

where $H_v$ is the differential head in terms of flowing fluid. Let it also be defined that $A_1$ is the cross sectional area of the pipe and $A_2$ is the cross sectional area of the orifice. Then $$A_1 = \frac{1}{4}\pi D^2 \quad (5)$$

and $$A_2 = \frac{1}{4}\pi d^2 \quad (6)$$

If it is further defined that Q is the rate of flowing fluid in terms of volume per unit time it should be apparent that $$A_1 V_1 = Q = A_2 V_2 \quad (7)$$

By substituting the values of $A_1$ and $A_2$ from Equations 5 and 6, respectively, into Equation 7 and simplifying there is obtained:

$$\frac{V_1}{V_2} = \frac{d^2}{D^2} \quad (8)$$

or $$V_1 = \frac{d^2 V_2}{D^2} \quad (9)$$

By substituting the value of $V_1$ from Equation 9 into Equation 4 there is obtained:

$$V_2^2 - \frac{d^4 V_2^2}{D^4} = 2gH_v \quad (10)$$

or $$V_2^2\left(1 - \frac{d^4}{D^4}\right) = 2gH_v \quad (11)$$

which can be simplified as follows:

$$V_2 = \sqrt{\frac{2gH_v}{1 - B^4}} \quad (12)$$

if the ratio of the orifice diameter to pipe diameter is represented by B. Equation 12 shows that the velocity of the flowing fluid is related to the differential fluid pressure and the internal diameters of both the pipe and the orifice inserted therein. Accordingly, the function of the orifice plate is to create a differential pressure from which the flowing fluid velocity can be determined.

By substituting the equivalent value of $A_2$ from Equation 6 and the equivalent value of $V_2$ from Equation 12 into Equation 7, which defines the rate of flow, there is obtained:

$$Q = A_2 V_2 = \frac{1}{4}\pi d^2 \sqrt{\frac{2gH_v}{1 - B^4}} \quad (13)$$

At this point in the development it is convenient to recognize the inevitable orifice losses and to enter an efficiency factor E in the flow Equation 13. The value of $$\frac{1}{\sqrt{1 - B^4}}$$

also can be included within this efficiency term so that Equation 13 becomes:

$$Q = \frac{1}{4}\pi d^2 E \sqrt{2gH_v} \quad (14)$$

The density of the gas $\rho_v$ at flowing conditions can be expressed as $$\rho_v = \rho_A G \times \frac{P}{P_0} \times \frac{T_0}{T} \times \frac{1}{Z} \quad (15)$$

where $\rho_A$ is the density of air at standard conditions of temperature and pressure, P is the absolute pressure of the flowing gas, $P_0$ is absolute standard pressure, T is the absolute temperature of the flowing gas, $T_0$ is absolute standard temperature, G is the specific gravity of the flowing gas at standard conditions of temperature and pressure and Z is the deviation of the flowing gas from the ideal gas laws. By letting $H_m$ be the differential head across the orifice in terms of the length of a column of mercury and $\rho_m$ the density of mercury it follows that $$H_v = \frac{\rho_m H_m}{\rho_v} = \frac{\rho_m H_m}{\rho_A G} \times \frac{P_0}{P} \times \frac{T}{T_0} \times Z \quad (16)$$

which when substituted in Equation 14 gives $$Q = \frac{1}{4}\pi d^2 E \sqrt{\frac{2g\rho_m H_m}{\rho_A G} \times \frac{P_0}{P} \times \frac{T}{T_0} \times Z} \quad (17)$$

which can be simplified as $$Q = Cd^2 E \sqrt{\frac{H_m T Z}{PG}} \quad (18)$$

where the constant C includes the acceleration of gravity g, the density of mercury $\rho_m$, the density of air $\rho_A$, the pressure of air under standard conditions $P_0$ and the absolute standard temperature $T_0$.

From Equation 18 it becomes apparent that in order to determine the flow of fluid through an orifice meter, which directly measures the term $H_m$, auxiliary equipment must be provided to calculate the specific gravity of the gas at standard conditions of temperature and pressure, the flowing pressure of the gas, the absolute temperature of the flowing gas and the factor Z. Thus, the measurement of gas flow is becoming more and more expensive as the gas industry continues to grow, since under present practices, to determine accurately these auxiliary quantities it is necessary to install special laboratory equipment to determine the factor Z, which for the most part relates to supercompressibility of the gases under the exceedingly high pressures presently being employed for transmission. In addition, periodic measurements must be taken of the specific gravity of the gas. This latter measurement normally is made by the conventional gas balance meter.

It can be seen from an observation of Equation 15 that the measurement of gas flow can be simplified considerably if means are provided to record the density of the gas under flowing conditions. If the quantity $p_v$ is known Equation 18 can be simplified as $$Q = C_1 d^2 E \sqrt{\frac{H_m}{p_v}} \qquad (19)$$

wherein the density $p_v$ replaces the four factors T, Z, P, and G, previously required and wherein the constant $C_1$ includes the constant C, the density of air at standard conditions $p_A$, the pressure of air at standard conditions $P_0$, and the absolute standard temperature $T_0$. It is a feature of the present invention to provide a simplified form of density meter which can be employed to record continuously the density of the gas being measured under conditions of actual flow. Such a meter materially aids in the simplification of gas flow measurements by the orifice meter.

It further is proposed that by providing a simple method of measuring gas density under flowing conditions, the path possibly may be cleared for replacing the now recognized "cubic foot" volume measurement of gas by the more practical pound or ton weight standard. It is believed that in the commercial adoption of a weight unit for measuring natural or manufactured gas various advantages would be provided since practically all engineering calculations, both mechanical and chemical, are already on a weight basis or on the basis of the chemical unit, the mol. A weight standard of measurement is superior to the volume unit in that no qualification of the weight unit is required. A cubic foot of gas, on the contrary, must be qualified with respect to both temperature and pressure. The usual practice in the commercial distribution of gas is to specify a pressure usually approximating that due to the altitude of some producing or marketing area. Accordingly, the so called "standard cubic foot" often has different values in different geographical parts of the country. Since the heating values of coal and oil generally are expressed in terms of B. t. u. per pound, it is believed that if the heating value of fuel gas were expressed in terms of the same units, the general public would be better able to judge the relative values of these three major fuels.

Equation 19 defines the rate of flow of fluid through an orifice meter wherein the density of the gas under consideration is known. By multiplying both sides of said Equation 19 by the density $p_v$, there is obtained:

$$Q p_v = M = C_1 d^2 E \sqrt{H_m p_v} \qquad (20)$$

where M is the weight of gas flowing per unit time. Thus, by providing a density meter capable of continuously measuring and recording the density of flowing fluid there results both a simplification in the method of measuring fluid flow and the necessary data for calculating the weight of fluid passing through a pipe per unit time.

Accordingly, it is an object of this invention to provide improved apparatus for measuring the density of fluids.

Another object is to provide a meter capable of indicating and recording the density of a fluid under flowing conditions.

Various other objects, advantages and features of this invention should become apparent from the following detailed description of a preferred embodiment thereof taken in conjunction with the accompanying drawing in which:

Figure 1, shown partially in section, illustrates the flow measuring apparatus in conjunction with a conduit carrying the fluid being measured;

Figure 2 illustrates the density meter employed in the measuring apparatus of Figure 1;

Figure 3 is a sectional view of the ring balance feature of the density meter;

Figure 4 is an alternate form of the ring balance feature illustrated in Figure 3;

Figure 5 is a schematic view of the electrical circuit employed to measure and record the fluid flow;

Figure 7 illustrates a modified suspension member for use with the density meter;

Figure 8 is a sectional view of Figure 7 taken along line 8—8; and

Figure 9 is a schematic view of an electrical circuit employed with the density measuring apparatus of this invention.

Figure 1:
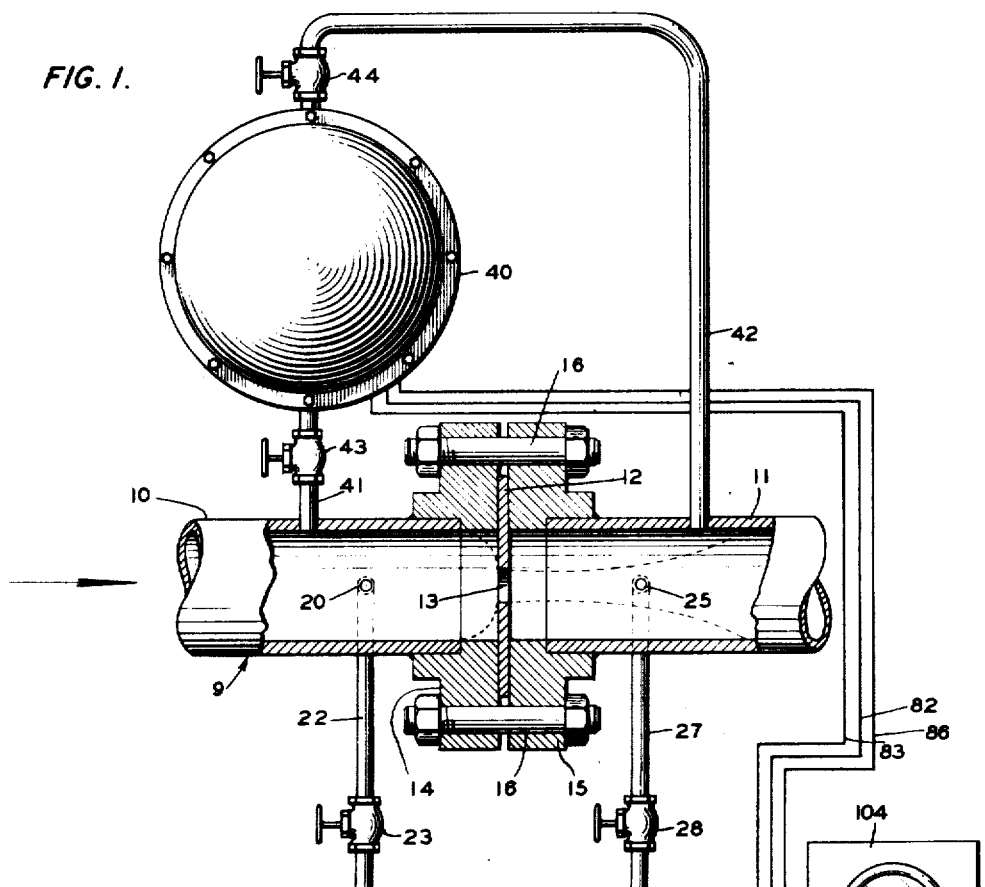

Referring now to the drawings in detail and to Figure 1 in particular, there is shown a pipeline 9 comprising adjacent conduit sections 10 and 11 through which the gas being measured is passed in the indicated direction, that is from section 10 to section 11. A circular metal orifice plate 12 having an aperture 13 therein is disposed between conduit sections 10 and 11 by means of flange members 14 and 15 which are secured together by bolts such as 16. Flange members 14 and 15 abut opposing ends of conduit sections 10 and 11, and either are welded thereto or formed as integral parts therewith. The apparatus disposed on the lower side of pipeline 9 comprises the somewhat conventional orifice meter. This meter includes a high pressure tap 20 inserted within conduit section 10 upstream from orifice plate 12, and a low pressure tap 25 is inserted within conduit section 11 downstream from orifice plate 12. Tap 20 is connected to a liquid chamber 21 by means of a conduit 22 having a valve 23 therein, and tap 25 is connected to a second liquid chamber 26 by means of a conduit 27 having a valve 28 therein. Liquid chambers 21 and 26 are connected to one another by means of a U-shaped manometer tube 30 attached to the lower ends of each of said chambers, said chambers being partially filled with an electrically conducting liquid 31 such as mercury which also completely fills manometer tube 30. An electrical resistance element 32 is disposed in a generally vertical position within liquid chamber 26. A first electrical lead 34 is attached to the upper end terminal of resistance element 32 and a second electrical lead 35 is attached to the lower end terminal of resistance element 32. Both leads 34 and 35 enter chamber 26 through insulating seals, not shown, at a point above the highest possible liquid rise therein. Lead 35 then passes to the lower end of element 32 through liquid 31. In this manner the effective electrical resistance of element 32 is determined by the level of liquid 31 within chamber 26 because an electrical circuit path is completed from lead 35 to element 32 through conducting liquid 31. Thus, when the liquid level in chamber 26 is at or near the bottom of said chamber the effective ohmic resistance of element 32 is a maximum, and as the liquid level approaches the top of chamber 26 the effective ohmic resistance of element 32 is progressively lessened due to the shorted circuit path through the rising liquid. In effect, the resistance of element 32 is a measure of the differential pressure between pressure taps 20 and 25 since the difference in liquid levels between chambers 21 and 26 determines the effective resistance of element 32. Electrical leads 34 and 35 pass from chamber 26 to housing 37 which contains additional electrical circuit elements illustrated schematically in Figure 5.

The density meter 40 of this invention, employed to determine the actual density of the fluid passing through pipeline 9, is illustrated on the upper side of said pipeline in Figure 1. Communication is established between meter 40 and pipeline 9 by conduits 41 and 42 connecting said meter with conduit sections 10 and 11, respectively. Valves 43 and 44 disposed in conduits 41 and 42, respectively, serve to regulate the flow of fluid through meter 40.

Meter 40, shown in detail in Figure 2, includes a housing 50 having a removable front member 51 whereby access can be had to the mechanism within. Because it is contemplated, that extremely high pressures may be encountered in practicing this invention; housing 50 is of suitable construction to withstand such pressure, which, for example, may be of the order of 1000 pounds per square inch. Housing 50 is provided with a flanged edge 52 having a plurality of bolt holes such as 56 drilled therein adjacent complementary bore holes such as 54 drilled in flanged edge 55 of front member 51. A suitable sealing gasket can be interposed between flanged edges 52 and 55 of housing 50 and front member 51 to prevent leakage of fluid therebetween when the housing and front member are bolted together. Mounted within housing 50 by means of a suitable supporting bracket, not shown, is a horizontal pivot rod 60. A ball bearing ring 61 is disposed about rod 60 to pivotally support a frame 62 which in turn is secured to and supports an annular tubular body 59. Frame 62 comprises rods 63 and 64 aligned axially, and a rod 65 perpendicular to rods 63 and 64, all of said rods being interposed between body 59 and bearing ring 61. As illustrated rods 63 and 64 are orientated in a generally horizontal position while rod 65 is in a generally vertical position extending downward from rod 60. Rods 64 and 65 are threaded to receive adjustable balance weights 66 and 67, respectively. These weights 66 and 67 preferably are constructed of a relatively dense material such as lead, and are provided with threaded bushings 68 and 69, respectively, of brass or other non-corrosive material.

A second and somewhat more sensitive method of pivoting the ring assembly is illustrated in Figures 7 and 8. A triangular shaped bar 110 serves as the support member in place of rod 60. A second bar 111, to which are secured rods 63 and 64, is suspended beneath bar 110 by means of four thin flexible metal strips 112, 113, 114, and 115. Strip 112 is attached to bar 110 by a clamp 117 and to the opposite side of bar 111 by a clamp 118. Strip 113 is attached to the second side of bar 110 by adjacent strip 112 by a clamp 119 and to the second side of bar 111 by a clamp 120. Strips 112 and 113 thus form a triangle with bar 111 the apex of which is at the apex of triangular bar 110. Strip 114 also is attached to bar 110 by a clamp 121 and to the opposite side of bar 111 by a clamp 122. Strip 115 is attached to the second side of bar 110 adjacent strip 114 by a clamp 123 and to the opposite side of bar 111 by a clamp 124. Strips 114 and 115 thus form a second triangle with bar 111, the apex of which also is at the apex of triangular bar 110. Accordingly, bar 111 is suspended by the four strips beneath bar 110. Rods 63 and 64 are aligned such that the common axis thereof falls at the apex of triangular bar 110 which is the pivot point for the suspension. This second form of pivot means does not constitute a part of the present invention per se, but rather is a modified Cardan suspension presently employed in commercial gas balances. The advantage of this pivot resides in the high degree of sensitivity provided by the nearly frictionless suspending flexible strips.

Tubular body 59, a sectional view of which is illustrated in Figure 3, preferably is formed as a hollow torus ring in which a segment of the ring has a larger internal cross sectional area than the remainder of said ring. This latter feature is illustrated by internal cavities 70 and 71, respectively. Torus ring 59 is constructed of a non-corrosive metal, stainless steel for example, although other materials such as any of several well known plastics can be employed, if desired. The ring either can be molded to the desired shape in halves which are joined together, or can be drilled from a cylindrically shaped member and then curved to the desired shape. The interior of hollow ring 59 is partially filled through removable plug 57 with a relatively dense liquid 72 such as mercury. For high pressure applications tube 59 can be filled with an inert gas under pressure in order to prevent collapse of the tube due to the pressure of the measured gas. In the illustrated embodiment ring 59 is oriented such that liquid 72 fills approximately half of each of the interior cavities 70 and 71, the midpoint of each cavity falling substantially along a horizontal diameter line through ring 59.

Tubular body 59 is provided with a small equatorial groove 73 on the periphery thereof from which a hollow buoyant member 75 is freely suspended by means of a flexible cable 76 attached to body 59 by a screw 77. Cable 76 rests within this equatorial groove 73, thereby allowing member 75 to be freely suspended tangentially from the periphery of member 59 at all times. A plurality of calibrating weights 78 are provided for selective attachment to cable 76 or member 75. For extremely high pressure applications it is contemplated that hollow member 75 either be replaced by a solid sphere, for example, magnesium protected by chromium plating, or filled with a gas also under high pressure. A pointer arm 80 of electrically conducting material, Figure 2, is secured to frame 62 near the point of attachment of said frame to ball bearing 61. The lower end of pointer arm 80 engages an electrical rheostat 81 attached near the bottom of housing 50. Electrical leads 82 and 83, which are selectively connected to the end terminals of rheostat 81, pass out of housing 50 through suitable sealing devices 84 and 85 repectively. A third electrical lead 86 is attached at one end to pointer arm 80 by means of screw 87. Lead 86 is positioned within housing 50 by means of a support rod 90 and a clip attachment 91 so as to be loosely connected between screw 87 and clip 91. This arrangement allows for rotation of pointer arm 80 and results in a nearly frictionless electrical connection. Lead 86 also passes out of housing 50 through a suitable sealing (not shown), and all three leads 82, 83 and 86 enter circuit housing 37. While this telemetering transmitter has been indicated somewhat diagrammatically for simplicity of explanation, instruments of this type are available commercially that have a "break away torque" of less than 0.2 ounce inch.

The operation of this apparatus to measure density should now become apparent from Figure 3. With tubular body 59 positioned as illustrated, that is, with liquid 72 occupying approximately half of each of interior chambers 70 and 71, it should be evident that the weight of liquid in the right half portion of body 59 is greater than the weight of liquid in the left half portion. On the other hand, buoyant member 75, calibrating weight 78, balancing weight 66 and the material of which the ring is constructed have a combined effect of increasing the weight on the left hand side of support rod 60. By suitable positioning of balance weights 66 and 67 a condition of initial equilibrium can be established. For purposes of explanation it will be assumed that the point 99 represents the center of gravity of tubular body 59, frame 62 and balancing weights 66 and 67, that is, the combined weight of the rotating member excluding liquid 72 contained therein and the external buoyant member and calibrating weights attached thereto. Once equilibrium initially has been established, let it be assumed that the density of the fluid being measured increases by an unknown amount. This in turn increases the buoyant force exerted upward on member 75 which tends to rotate body 59 in a clockwise direction. This rotation in effect fills cavity 70 with a larger amount of liquid 72, and at the same time decreases the amount of liquid in cavity 71. Such a shift in the weight of liquid into the larger cavity 71 tends further to increase the clockwise rotation of member 59. However, at this same time the center of gravity 99 also is rotated in a clockwise direction which has the effect of moving the center of gravity outward and upward from a vertical center line through support rod 60. This in turn increases the counterclockwise moment exerted by the center of gravity. Rotation in the clockwise direction thus continues until the rotating moment is balanced by the increased counterclockwise moment exerted by the center of gravity. At this point equilibrium once again is established. It should be noted that the downward force of buoyant weight 75 and calibrating weights 78 acts through a constant lever arm at all times due to the free suspension from the periphery of body 59. Conversely, it should be evident that a decrease in density of the fluid being measured has exactly the opposite effect, that is, the resulting counterclockwise rotation of body 59 shifts more liquid 72 into chamber 71 thereby resulting in a decreased clockwise moment being exerted by liquid 72. However, this again is balanced by an equal decrease in counterclockwise moment exerted by the center of gravity 99 which is rotated nearer to the vertical center line through support rod 60.

It should be observed that the principle of determining the density of a fluid by measuring the buoyant force exerted by the fluid on a body suspended therein is well known and can be traced back as far as Archimedes. However, in accordance with the present invention several improved features are incorporated in the apparatus for making such a measurment. By causing a change in density of the fluid to shift a mass of mercury, there is provided an amplification of the displacement, thereby resulting in increased sensitivity. The degree of this amplification is a matter of design of the components of the instrument, particularly the relative cross-sectional areas of sections 70 and 71, and can be readily calculated from the well known trigonometric relationships. The present density meter has a "dead beat" characteristic. That is, it moves to indicate a density change without going into the long continued oscillations which are characteristic of the gas balances presently in general usage. This desired "dead beat" characteristic is made possible by friction of the mercury on the unwetted internal walls of the ring. Otherwise the instrument operates in nearly a frictionless manner due to the extremely small frictional forces exerted by the Cardan suspension or ball bearing pivot and the low torque electrical telemetering transmitter.

In Figure 4 a second embodiment of the balance ring is illustrated. The ring itself is constructed identically to that shown in Figure 3 except that buoyant member 75' is suspended from the right side of body 59' instead of the left side. In order to establish initial balance under this condition, balancing weight 66' generally is moved near the outer edge of rod 64' and balancing weight 67' is moved nearer support rod 60'. This in turn shifts the center of gravity of the rotating unit to a position which may be represented by point 99'. It should be apparent that operation of this modified form of ring balance takes place substantially as described with reference to Figure 3, that is, any increase in density of the fluid being measured rotates body 59' in a counterclockwise direction which shifts more mercury into chamber 71'. However, this decreased clockwise moment exerted by liquid 72' again is balanced by a decrease in counterclockwise moment exerted by the inwardly shifted center of gravity 99'. If the density of the fluid being measured decreases, body 59' is rotated in a clockwise direction which shifts more liquid into chamber 70'. However, this increase in clockwise moment exerted by liquid 72' again is balanced by an equal increase in counterclockwise moment due to the outwardly shifted position of the center of gravity 99'.

From the foregoing description it should be evident that the rotation of body 59 is indicative of any change in density of the fluid in which buoyant member 75 is suspended. The degree of rotation of body 59 is determined electrically by measuring the position of pointer arm 80 on rheostat 81. As shown in Figure 5 a voltage source 90 is applied across the end terminals of rheostat 81 by means of connecting leads 82 and 83. A portion of the entire voltage drop across rheostat 81 is picked off said rheostat by means of electrical lead 91 connected to one end terminal of rheostat 81 and electrical lead 86 connected to pointer arm 82 which makes contact with some intermediate point on rheostat 81. Thus, the potential difference between leads 86 and 91 is representative of the position of pointer arm 80 on rheostat 81, which in turn is a measurement of the rotation of body 59. A measurement of this voltage provides an indication of the density of the fluid surrounding buoyant member 75. The density meter 40 initially is calibrated by filling housing 50 with a fluid of known density, and noting the position of pointer arm 80 at balance. The addition or subtraction of calibrating weights 78 results in a change in calibration of the indicated voltage signal.

Figure 6:
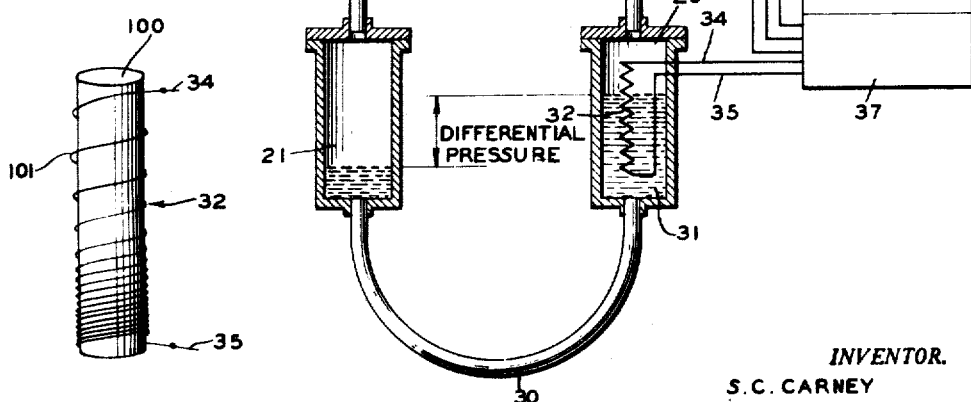
Figure 6 illustrates a pressure differential measuring electrical resistance element.

In accordance with Equation 20, the total weight of fluid passing through pipeline 9 is obtained by multiplying the volume rate of flow of the fluid by the density of the flowing fluid. The pressure differential $H_m$ which exists between taps 20 and 25 is directly proportional to the square of the velocity of flow. Thus, if the resistance of element 32 varies in accordance with the square root of the difference in mercury levels between chambers 21 and 22 the effective ohmic resistance of element 32 is inversely proportional to the velocity of flow through pipeline 9. Such an indication is provided by means of the resistance element 32 more fully illustrated in Figure 6. This element consists of an insulating support such as ceramic rod 100 about which is coiled a resistance wire 101, said wire 101 being wound on core 100 in accordance with a square law function, that is, the turns of wire 101 are progressively closer to one another as wound from top to bottom of core 100. This increased degree of closeness in winding is in accordance with a square law function. Thus, as the mercury level falls within chamber 26 in accordance with a decrease in velocity of the fluid passing through conduit pipeline 9 the effective ohmic resistance of element 32 is increased in accordance with the square root of the falling mercury level.

In Figure 5 resistance element 32 is illustrated as being connected in series with voltage source 90 by means of connecting leads 34 and 35. The electric current passing through this circuit therefore is directly proportional to the velocity of the fluid passing through pipeline 9, and a measurement of such current will give an indication of the fluid velocity. In order to provide a measurement of the total weight of fluid passing through the conduit sections a conventional watt meter or preferably a watt-hour meter 104 is provided. Positioned within meter 104 is a voltage coil 105 connected across leads 86 and 91, and a current coil 106 connected in series with resistance element 32 by means of connecting leads 35 and 107. Accordingly, meter 104 indicates the product of these two electrical quantities which is a measurement of the product of the fluid flow velocity and the density of said fluid. By suitable calibration, meter 104 can read directly the pounds or tons of fluid passing through conduit pipeline 9 for any given time interval.

The circuit illustrated in Figure 9 is employed when the apparatus is used only to measure the density of fluid. The circuit is generally similar to that shown in Figure 5 and corresponding elements are designated by like primed reference numerals. Coil 105 of meter 104 in Figure 5 is replaced by a voltmeter 130 which indicates the potential drop between one end terminal of potentiometer 81 and the contactor thereof. This potential drop is a function of the position of pointer 80.

While this invention has been described in conjunction with a present preferred embodiment thereof, it should be apparent to those skilled in the art that various modifications can be made without departing from the scope of this invention.

Having described my invention, I claim:

1. A density meter comprising, in combination, a support; a hollow annular body pivoted thereon for rotation about a horizontal axis, said axis of rotation being the axis of said annular body, a portion of said body having a larger internal cross-sectional area than the remainder of said body; a liquid partially filling said body; a member freely suspended tangentially from the periphery of said body, said member being adapted to be suspended within fluid, the density of which is to be determined; at least one balancing weight secured to said body to establish initial balance between said body and said member thereby preventing rotation of said body; and means for indicating rotation of said body responsive to changes in density of the fluid being measured.

2. A density meter comprising, in combination; a support; a hollow torus pivotally mounted thereon for rotation about a horizontal axis coaxial of the torus, a segment of said torus having a larger internal cross-sectional area than the remainder of said torus; a liquid partially filling said torus; a buoyant member freely suspended tangentially from the periphery of said torus, said buoyant member being adapted to be freely suspended within fluid, the density of which is to be determined; at least one balancing weight secured to said torus to establish initial balance between said torus and said buoyant member thereby preventing rotation of said torus; and means for indicating rotation of said torus responsive to changes in density of the fluid being measured.

3. A density meter comprising, in combination; a support; a hollow torus pivotally mounted thereon for rotation about a horizontal axis coaxial of the torus, a segment of said torus having a larger internal cross-sectional area than the remainder of said torus; a liquid partially filling said torus; a buoyant member freely suspended tangentially from the periphery of said torus, said buoyant member being adapted to be freely suspended within fluid, the density of which is to be determined; at least one balancing weight secured to said torus to establish initial balance between said torus and said buoyant member thereby preventing rotation of said torus, said initial balance being such that the liquid contained within said torus partially fills both the large and small cross-sectional areas thereof; and means for indicating rotation of said torus responsive to changes in density of the fluid being measured.

4. The combination in accordance with claim 3 wherein said buoyant member initially is suspended from that segment of said torus having the smaller internal cross-sectional area.

5. The combination in accordance with claim 3 wherein said buoyant member initially is suspended from that segment of said torus having the larger internal cross-sectional area.

6. A density meter comprising, in combination, a support; a hollow torus having a sector thereof of larger internal cross-sectional area than the remainder of said torus; a liquid partially filling said torus; a frame secured to said torus; means pivotally mounting said frame on said support whereby said torus is free to rotate about a horizontal axis coaxial of the torus; a hollow buoyant member freely suspended tangentially from the periphery of said torus, said buoyant member being adapted to be freely suspended within fluid, the density of which is to be determined; at least one calibrating weight selectively attachable to said buoyant member; at least one balancing weight adjustably attached to said frame whereby initial balance is established between said torus and said buoyant member thereby preventing rotation of said torus, said initial balance position being such that the liquid contained within the torus partially fills both the large and small internal cross-sectional areas thereof; and means for indicating rotation of said torus responsive to changes in density of the fluid being measured.

7. The combination in accordance with claim 6 wherein said rotation indicating means comprises a potential divider having a voltage source applied thereacross; a contactor secured to said torus and adapted to slide across said potential divider whereby the position of said contactor on said potential divider indicates the degree of rotation of said torus; output leads connected to said contactor and to one end terminal of said potential divider; and voltage indicating means connected to said output leads.

8. The combination in accordance with claim 7 wherein said buoyant member initially is suspended from that segment of said torus having the smaller internal cross-sectional area.

9. The combination in accordance with claim 6 wherein said buoyant member initially is suspended from that segment of said torus having the larger internal cross-sectional area.

10. A density meter comprising, in combination, a support; a hollow annular body pivoted thereon for rotation about a horizontal axis which is the axis of said annular body, a portion of said body having a larger internal cross-sectional area than the remainder of said body; a liquid partially filling said body; a member freely suspended tangentially from the periphery of said body, said member being adapted to be suspended within fluid, the density of which is to be determined, said body and said member being of such configuration that said body remains motionless when said member is suspended in a fluid of predetermined density; and means for indicating rotation of said body responsive to changes in density of the fluid being measured.

11. In a system to determine the weight of flowing gases comprising means to measure the volume of gas flow, means to measure the density of the flowing gases, and means to multiply said volume measurement by said density measurement; improved means to measure the density of said gas comprising, a vessel in communcation with the flowing gas to be measured, a support mounted in said vessel, a hollow annular body pivoted thereon for rotation about a horizontal axis, said axis of rotation being the axis of said annular body, a portion of said body having a larger internal cross-sectional area than the remainder of said body, a liquid partially filling said body, a member freely suspended tangentially from the periphery of said body, said member being freely suspended within said vessel, at least one balancing weight secured to said body to establish initial balance between said body and said member thereby preventing rotation of said body, and means for indicating rotation of said body responsive to changes in density of the gas within said vessel, said means providing a measurement of the density of the flowing gas.

12. In a system to determine the weight of flowing gases comprising means to measure the volume of gas flow, means to measure the density of the flowing gas, and means to multiply the said volume measurement by said density measurement; improved means to measure the density of said gas comprising, a vessel in communication with the flowing gas to be measured, a support mounted in said vessel, a hollow torus pivotally mounted on said support for rotation about a horizontal axis coaxially of the torus, a segment of said torus having a larger internal cross sectional area than the remainder of said torus, a liquid partially filling said torus, a buoyant member freely suspended tangentially from the periphery of said torus, said buoyant member being freely suspended within said vessel, at least one balancing weight secured to said torus to establish initial balance between said torus and said buoyant member thereby preventing rotation of said torus, and means to indicate rotation of said torus responsive to changes in density of the gas within said vessel, said means providing a measurement of the density of the flowing gas.

References Cited in the file of this patent

UNITED STATES PATENTS

| Number | Name | Date |
|---|---|---|
| 494,192 | Durr | Mar. 28, 1893 |
| 1,120,214 | Metzdorff | Dec. 18, 1914 |
| 1,325,763 | Spitzglass | Dec. 23, 1919 |
| 1,449,437 | Obermaier | Mar. 27, 1923 |
| 1,602,444 | Naiman | Oct. 12, 1926 |
| 1,838,399 | Hodgson | Dec. 29, 1931 |
| 2,018,431 | Wolf | Oct. 22, 1935 |
| 2,082,539 | Fischer | June 1, 1937 |
| 2,217,361 | Evjen | Oct. 8, 1940 |
| 2,221,943 | Fischer | Nov. 19, 1940 |
| 2,235,064 | Cloud | Mar. 18, 1941 |

FOREIGN PATENTS

| 568,195 | France | Dec. 18, 1923 |

UNITED STATES PATENT OFFICE
CERTIFICATE OF CORRECTION

Patent No. 2,703,494                            March 8, 1955

Samuel C. Carney

It is hereby certified that error appears in the printed specification of the above numbered patent requiring correction and that the said Letters Patent should read as corrected below.

Column 1, line 33, for "fo" read — of —; column 9, line 37, for the claim reference numeral "6" read — 7 —.

Signed and sealed this 16th day of August 1955.

(SEAL)

Attest:

E. J. MURRY
Attesting Officer

ROBERT C. WATSON
Commissioner of Patents